United States Patent
Eick et al.

(10) Patent No.: US 7,237,535 B2
(45) Date of Patent: Jul. 3, 2007

(54) ENHANCED ACCURACY FUEL METERING SYSTEM AND METHOD

(75) Inventors: Chris D. Eick, Phoenix, AZ (US);
Dugan Shelby, South Bend, IN (US);
John R. Harkey, Tucson, AZ (US)

(73) Assignee: Honeywell International Inc., Morristown, NJ (US)

( * ) Notice: Subject to any disclaimer, the term of this patent is extended or adjusted under 35 U.S.C. 154(b) by 78 days.

(21) Appl. No.: 11/253,327

(22) Filed: Oct. 19, 2005

(65) Prior Publication Data

US 2007/0044768 A1 Mar. 1, 2007

Related U.S. Application Data

(60) Provisional application No. 60/670,536, filed on Apr. 11, 2005.

(51) Int. Cl.
*F02N 51/00* (2006.01)
*B60T 7/12* (2006.01)

(52) U.S. Cl. .................. 123/478; 123/480; 701/103

(58) Field of Classification Search ........... 123/478, 123/480; 137/486; 701/103
See application file for complete search history.

(56) References Cited

U.S. PATENT DOCUMENTS

| | | | |
|---|---|---|---|
| 3,530,281 A | 9/1970 | Smeiman | |
| 3,560,941 A | 2/1971 | Wallace, Jr. | |
| 4,346,443 A | 8/1982 | De Angelis et al. | |
| 4,534,014 A | 8/1985 | Ames | |
| 5,743,097 A * | 4/1998 | Frank | 62/68 |
| 5,846,157 A | 12/1998 | Reinke et al. | |
| 5,944,048 A * | 8/1999 | Bump et al. | 137/487.5 |
| 6,090,123 A * | 7/2000 | Culp et al. | 606/180 |
| 6,119,710 A * | 9/2000 | Brown | 137/14 |
| 6,561,164 B1 * | 5/2003 | Mollin | 123/446 |
| 6,698,203 B2 * | 3/2004 | Wang | 60/611 |
| 6,947,826 B2 * | 9/2005 | Deibert et al. | 701/109 |
| 6,962,164 B2 * | 11/2005 | Lull et al. | 137/2 |
| 7,114,511 B2 * | 10/2006 | Lull et al. | 137/1 |
| 2003/0079723 A1 * | 5/2003 | Mollin | 123/446 |

* cited by examiner

*Primary Examiner*—Thomas Moulis
(74) *Attorney, Agent, or Firm*—Ingrassia Fisher & Lorenz

(57) ABSTRACT

A valve assembly having a position control characteristic that is represented by an N-th order polynomial equation includes a valve housing a valve element, and a valve characterization circuit. The valve housing has at least a fluid inlet, a fluid outlet, and a flow passage between the fluid inlet and fluid outlet. The valve element is mounted on the valve housing, is disposed at least partially within the valve housing flow passage, and is movable between a closed position and an open position. The valve characteristic circuit is mounted on the valve housing, and includes a plurality of resistors. Each resistor has a resistance value representative of at least one digit in the N-th order polynomial equation.

20 Claims, 2 Drawing Sheets

ENHANCED ACCURACY FUEL METERING SYSTEM AND METHOD

CROSS-REFERENCES TO RELATED APPLICATIONS

This application claims the benefit of U.S. Provisional Application No. 60/670,536 filed Apr. 11, 2005.

TECHNICAL FIELD

The present invention relates to valve control and, more particularly, to a system, valve, and method for enhancing the accuracy of metering fluid flow through the valve.

BACKGROUND

Typical gas turbine engine fuel supply systems include a fuel source, such as a fuel tank, one or more pumps, and a main fuel supply line. The pumps draw fuel from the tank and deliver pressurized fuel to the fuel manifolds in the engine combustor via the main supply line. The main supply line may include one or more valves in flow series between the pumps and the fuel manifolds. These valves generally include at least a fuel metering valve and a pressurizing-and-shutoff valve downstream of the main metering valve. In addition to the main supply line, many fuel supply systems also include a bypass flow line connected upstream of the fuel metering valve that bypasses a portion of the fuel flowing in the main supply line back to the inlet of the one or more pumps, via a bypass valve. The position of the bypass valve, if included, may be controlled to maintain a substantially fixed differential pressure across the fuel metering valve.

A redundant channel engine controller such as, for example, a Full Authority Digital Engine Controller (FADEC), controls the operation of the engine and the fuel supply system. In particular, each of the redundant channels in the engine controller receives input parameters from the engine and aircraft and a thrust setting from the pilot. In response to these inputs, the engine controller modulates the position of at least the fuel metering valve to control the fuel flow rate to the engine fuel manifolds to maintain the desired thrust. In many instances, the position of the fuel metering valve, and thus fuel flow, is controlled based on a nominal fuel flow calibration curve that may be built into, or programmed into, the engine controller.

Although the above-described system and method for controlling fuel flow is generally safe, reliable, and robust, it does suffer certain drawbacks. For example, the fuel metering accuracy is presently limited to the mechanical tolerances of the fuel metering valves. Although accuracy could be enhanced by storing individual fuel metering valve fuel control calibration data directly on the fuel metering valves it is presently not possible to do so using a conventional electronic storage device, such as an EEPROM. This is because the fuel metering valve typically reaches temperatures during engine operations that are too high for such conventional electronic storage devices to operate.

Hence, there is a need for a circuit and method of increasing the fuel metering accuracy of gas turbine engine fuel metering valves, as well as the position control accuracy of various other valves, without further reliance on mechanical tolerances and by using calibration data that is stored on the valve. The present invention addresses at least these needs.

BRIEF SUMMARY

The present invention provides a circuit and method of increasing the position control accuracy of valves that uses calibration data stored on the valve and without the need to rely on mechanical tolerances.

In one embodiment, and by way of example only, a fuel metering system includes a fuel metering valve, a valve characteristic circuit, and a controller. The fuel metering valve is coupled to receive valve position commands and is operable, in response thereto, to move to a valve position. The fuel metering valve has a position control characteristic that is represented by an N-th order polynomial equation. The valve characteristic circuit is mounted at least proximate the fuel metering valve, and includes a plurality of resistors. Each resistor has a resistance value representative of at least one digit in the N-th order polynomial equation. The controller is coupled to the valve characteristic circuit and is operable to selectively determine the resistance value of each resistor, determine the fuel metering valve position control characteristic using the determined resistance values, and selectively supply the valve position commands to the fuel metering valve using the determined fuel metering valve position control characteristic.

In another exemplary embodiment, a valve assembly having a position control characteristic that is represented by an N-th order polynomial equation includes a valve housing, a valve element, and a valve characterization circuit. The valve housing has at least a fluid inlet, a fluid outlet, and a flow passage between the fluid inlet and fluid outlet. The valve element is mounted on the valve housing, is disposed at least partially within the valve housing flow passage, and is movable between a closed position and an open position. The valve characteristic circuit is mounted on the valve housing, and includes a plurality of resistors. Each resistor has a resistance value representative of at least one digit in the N-th order polynomial equation.

In yet another exemplary embodiment, a method of supplying flow calibration data for a valve assembly includes measuring flow versus valve position data for the valve, and determining an N-th order polynomial curve fit equation, which includes N-number of coefficients, from the measured flow versus position data. Resistance values are determined to represent at least one digit in each of the N-number of coefficients. A plurality of resistors, each having a resistance value equal to one of the determined resistance values, is mounted at least adjacent to the valve assembly.

Other independent features and advantages of the preferred system, valve assembly, and method will become apparent from the following detailed description, taken in conjunction with the accompanying drawings which illustrate, by way of example, the principles of the invention.

DETAILED DESCRIPTION OF A PREFERRED EMBODIMENT

The following detailed description of the invention is merely exemplary in nature and is not intended to limit the invention or the application and uses of the invention.

Furthermore, there is no intention to be bound by any theory presented in the preceding background of the invention or the following detailed description of the invention. In this regard, although the following description is directed to a fuel metering valve and the fuel delivery and control system in which the fuel metering valve is installed, it will be appreciated that the present invention is not limited to this type of valve, system, or environment. Rather, the present invention may be implemented in any one of numerous types of valves, for any one of numerous types of systems, and in any one of numerous environments.

Figure 1:
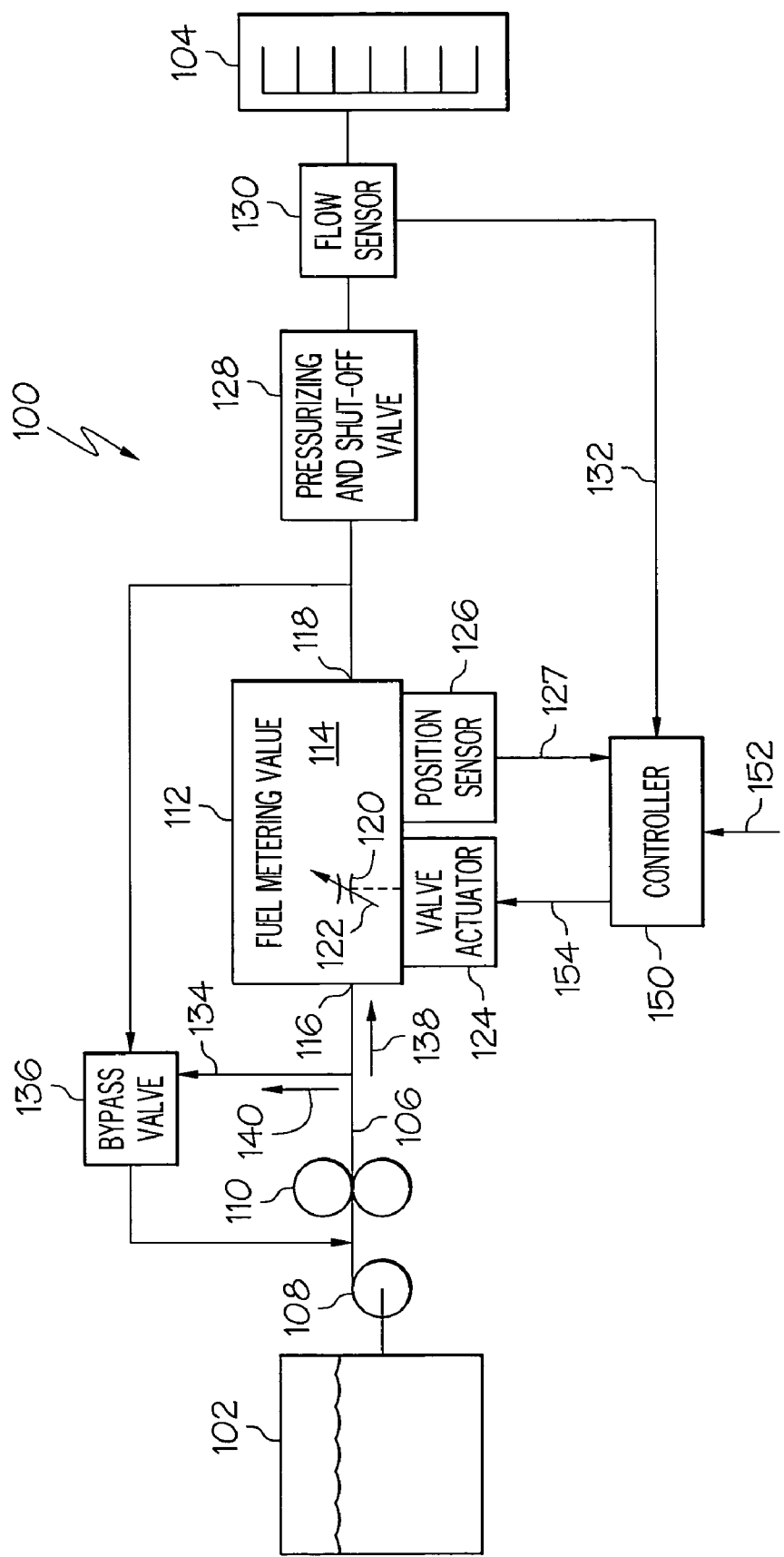
FIG. 1 is a schematic representation of an embodiment of a fuel delivery and control system for a gas turbine engine that may include an embodiment of the present invention.

A fuel delivery and control system for a gas turbine engine, such as a turbofan jet aircraft engine, according to one embodiment the present invention, is depicted in FIG. 1. The system 100 includes a fuel source 102, such as a tank, that stores the fuel supplied to a jet engine combustor 104. A supply line 106 is coupled to the fuel source 102 and, via various components, delivers the fuel to the combustor 104. It is noted that the supply line 106 is, for convenience, depicted and described with a single reference numeral. However, it will be appreciated that the system is implemented using separate sections of piping, though a single section is certainly not prohibited.

One or more pumps are positioned in flow-series in the supply line 106 and draws fuel from the fuel source 102. In the depicted embodiment, a booster pump 108, such as a relatively low horsepower centrifugal pump, and a high pressure pump 110, such as a positive displacement pump, are used. The booster pump 108 takes a suction directly on the fuel source 102 and provides sufficient suction head for the high pressure pump 110. The high pressure pump 110 then supplies the fuel, at a relatively high pressure, such as up to 1200 psi, to the remainder of the supply line 106.

A fuel metering valve 112 is positioned in flow-series in the supply line 106 downstream of the high pressure pump 110. The fuel metering valve 112 includes a valve housing 114 having a fluid inlet 116, a fuel outlet 118, and a flow passage 120 through which a portion of the fuel in the supply line 106 flows. A valve element 122 is coupled to the valve housing 114 and extends into the flow passage 120. The valve element 122 is movable between a closed position and a full-open position. The position of the valve element 122 controls the flow rate of fuel through the fuel metering valve 112. A valve actuator 124 is coupled to the valve element 122 and is used to adjust the position of the fuel metering valve 112, and thus the fuel flow rate through the fuel metering valve 112. In the depicted embodiment, the fuel metering valve 112 is a hydraulically-operated valve and the valve actuator 124 is an electro-hydraulic servo valve (EHSV) that adjusts the position of the valve element 122 by controlling the flow of operational hydraulic fluid to the fuel metering valve 112. It will be appreciated that the fuel metering valve 112 and the valve actuator 124 just described are merely exemplary of a particular preferred embodiment, and that each may be implemented using other types of components. For example, the fuel metering valve 112 may be an electrically operated valve. In this case, it may include an electrical valve actuator 124. In any case, fuel flow rate through the fuel metering valve 112 and to the combustor 104 is controlled by adjusting the position of the valve element 122 via the valve actuator 124.

A position sensor 126 is coupled to the fuel metering valve 112, and is used to sense the fuel metering valve's position and supply a valve position signal 127 representative thereof. The position of the fuel metering valve 112, as was just noted, controls the fuel flow rate to the combustor 104. The position sensor 126 may be any one of numerous types of position sensors including, for example, a linear variable differential transformer (LVDT), a rotary variable differential transformer (RVDT), an optical sensor, or a float-type sensor, just to name a few.

Two additional major components are positioned in flow-series in the supply line 106 between the fuel metering valve 112 and the combustor 104. These two major components are a pressurizing and shutoff valve 128 and a flow sensor 130. The pressurizing-and-shutoff valve 128 functions to maintain a reference pressure magnitude is in the supply line 106 downstream of the fuel metering valve 112, and shuts when the pressure falls below this minimum pressure magnitude. The flow sensor 130 measures the fuel flow rate to the combustor 104 and generates a flow signal 132 representative of the measured flow rate.

The fuel delivery and control system 100 depicted in FIG. 1 additionally includes a bypass flow line 134 and a bypass valve 136. The bypass flow line 134 is connected to the supply line 106 between the high pressure pump 110 and the fuel metering valve 112. The bypass valve 136 is positioned in flow-series in the bypass flow line 134 and is positioned to selectively divert a portion of the fuel flowing in the supply line 106 back to the inlet of the high pressure pump 110, to thereby maintain a substantially constant pressure drop across the fuel metering valve 112. Thus, as indicated by the flow arrows in FIG. 1, a first fraction 138 of the fuel in the supply line 106 is directed through the fuel metering valve 112, and a second fraction 140 is selectively directed through the bypass valve 136.

An engine controller 150, such as a Full Authority Digital Engine Controller (FADEC), controls the overall operation of the aircraft's engines, including the flow of fuel to the combustors 104 in each engine. With respect to fuel flow, the controller 150 receives various input signals and controls the fuel flow rate to the combustor 104 accordingly. More specifically, the controller 150 receives an input control signal 152 from throttle control equipment (not illustrated) in the cockpit, the position signal 127 from the position sensor 126, and the flow signal 132 from the flow sensor 130. The controller 150, in response to one or more of these signals, supplies valve position commands 154 to the fuel metering valve 112, and more specifically to the valve actuator 124. In response to the valve position commands 154, the valve actuator 124 positions the fuel metering valve 112 to obtain the desired flow rate to the combustor 104.

It will be appreciated that the valve position commands 154 supplied by the controller 150 are based, at least in part, on a position control characteristic of the specific fuel metering valve 112 that is installed in the system 100. In the depicted embodiment the particular position control characteristic is a flow versus valve position characteristic that the controller 150 implements using data that are selectively retrieved from the fuel metering valve 112. Preferably, the retrieved data are based on data collected during acceptance testing of the fuel metering valve 112. In the depicted embodiment, the collected data, using well known curve fitting techniques, are used to determine a flow versus valve position characteristic curve and the characteristic equation that generates the determined characteristic curve. Although the specific characteristic equation may vary from valve design to valve design, and from particular valve to particular valve of the same valve design, the characteristic equation is typically an N-th order polynomial equation of the following general form:

$$C_N x^N + C_{N-1} x^{N-1} + C_{N-2} x^{N-2} + \ldots + C_3 x^3 + C_2 x^2 + C_1 x + C_0.$$

Figure 2:
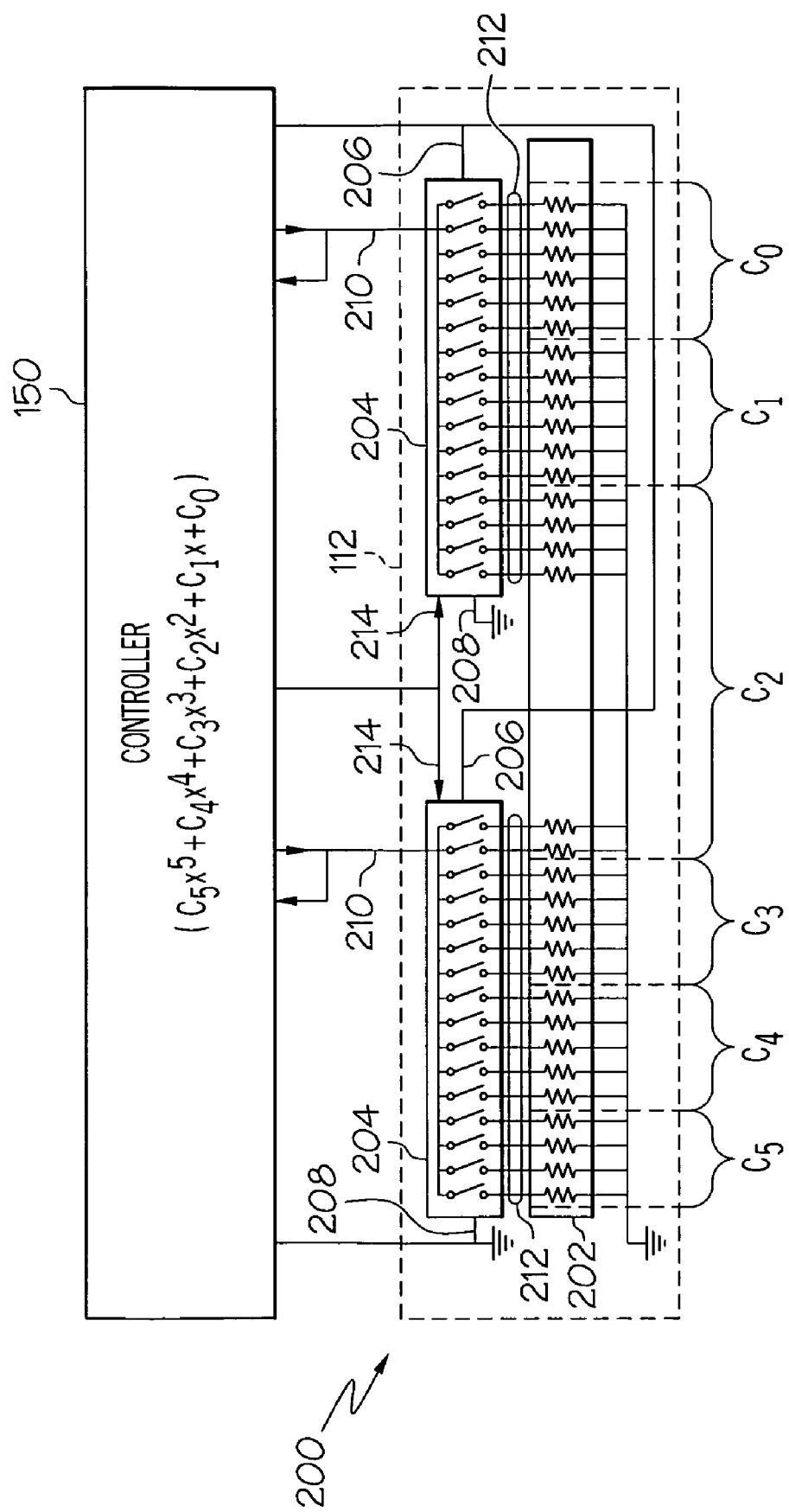
FIG. 2 is a functional block diagram of an embodiment of a valve characteristic circuit that may be mounted on the fuel metering valve, and coupled to the controller, that are illustrated in FIG. 1

A more detailed description as to how the flow calibration data are stored, and when and how these data are retrieved by the controller 150, will now be described. In doing so, reference should now be made to FIG. 2, which depicts a block diagram of the controller 150 and its electrical interconnection to a portion of the fuel metering valve 112. As shown in FIG. 2, a valve characteristic circuit 200 is mounted on the fuel metering valve 112 and is electrically coupled to the engine controller 150. It will be appreciated that the valve characteristic circuit 200 need not be mounted on the fuel metering valve 112, but could instead be mounted adjacent to, or remote from, the fuel metering valve 112. Preferably, however, the valve characteristic circuit 200 is mounted on, or at least adjacent to, the fuel metering valve 112.

The valve characteristic circuit 200 includes a plurality of resistors 202 and one or more multiplexers 204. Each resistor 202 is coupled in series between one of the multiplexers 204 and ground (or common), and each has a resistance value that is representative of at least one digit in the characteristic equation. It will be appreciated that the number of resistors 202 that are included, and the resistance value of each resistor 202, will depend, at least partially, on the order of the characteristic equation associated with the particular fuel metering valve 112, and on the precision to which the coefficients of the characteristic equation were determined. For example, each resistor 202 could have a resistance value that represents an entire coefficient ($C_0$, $C_1$, $C_2$, ..., $C_N$), or a portion of a coefficient, such as one or more digits in one or more decades of each coefficient. Preferably, however, each resistor 202 has a resistance value that represents one digit in one decade of each coefficient. Thus, for example, if the constant coefficient ($C_0$) in the N-th order polynomial is equal to 32.397, then five resistors 202 are used to represent this coefficient. One of the resistors 202 will have a resistance value representative of "30," one will have a resistance value representative of "2," one will have a resistance value representative of "0.3," one will have a resistance value representative of "0.09," and one will have a resistance value representative of "0.007."

As FIG. 2 shows, the characteristic equation in the depicted embodiment is implemented using a $5^{th}$ order polynomial ($C_5 x^5 + C_4 x^4 + C_3 x^3 + C_2 x^2 + C_1 x + C_0$), and a total of 32 resistors 202 are used to represent the coefficients ($C_0$, $C_1$, $C_2$, $C_3$, $C_4$, $C_5$) of the polynomial. In particular, 6 resistors are used to represent the constant ($C_0$), the first order coefficient ($C_1$), and the second order coefficient ($C_2$), 5 resistors are used to represent the third order coefficient ($C_3$), and the fourth order coefficient ($C_4$), and 4 resistors are used to represent the fifth order coefficient ($C_5$), for a total of 32 resistors. It will be appreciated that this total number of resistors 202, and number of resistors 202 per coefficient is merely exemplary, and that various other numbers of resistors 202, both total and per coefficient, could be used.

In addition to the potential variation in the total number of resistors 202, the number of different resistance values that are used may also vary. Moreover, the specific and relative magnitudes of each of the different resistance values that are used may vary depending, for example, on circuit 200 response with temperature. For example, if the multiplexers 204 have a relatively high leakage current at relatively high temperatures, then relatively low resistance values may be chosen. Moreover, the relative resistance values are chosen so that the spacing between resistance values is sufficiently wide to take leakage, resistor error, injection current error, and multiplexer switch resistance into account. In one particular preferred embodiment, standard 1% resistors of the following ten different resistance values are used: 0 Ω jumper, 1 kΩ, 2 kΩ, 3.01 kΩ, 4.03 kΩ, 5.05 kΩ, 6.04 kΩ, 7.06 kΩ, 8.06 kΩ, and 9.09 kΩ.

The multiplexers 204 are coupled between the engine controller 150 and each of the resistors 202 and are used to selectively couple the engine controller 150 to one of the resistors 202. In the depicted embodiment, the valve characteristic circuit 200 is implemented with two 16-channel multiplexers 204, though it will be appreciated that this number and type of multiplexer 204 is merely exemplary, and that other numbers of multiplexers 204, which may be implemented with other numbers of channels, could additionally be used. Each multiplexer 204 is also preferably implemented using a multiplexer that is designed to withstand relatively high temperatures. Although various high-temperature multiplexers may be used, in the depicted embodiment, the HT506 multiplexer, which is produced by Honeywell Solid State Electronics Center (SSEC), is used. This particular multiplexer is designed to run continuously for 50,000 hours at 437° F.

The multiplexers 204 each include a power supply terminal 206, a ground (or common) terminal 208, a supply/sense terminal 210, a plurality of resistor terminals 212, and a plurality of channel select terminals 214. The power supply terminals 206 are used to couple the multiplexers 204 to a source of operational power, which in the depicted embodiment is supplied from the controller 150. The ground terminal 208 is coupled to circuit ground (or common), the supply sense/terminals 210 and the channel select terminals 214 are coupled to the controller 150, and the resistor terminals 208 are each coupled to one of the resistors 202. As will now be described, the multiplexers 204, in a conventionally known manner, respond to channel select signals that are supplied from the controller 150, to selectively couple its supply/sense terminal 210 in series with one of its resistor terminals 212, and thus couple one of the resistors 202 to the controller 150.

The controller 150 is configured to, among various other functions, selectively determine the resistance value of each of the resistors 202 and, using the determined resistance values, to determine the position control characteristic for the fuel metering valve 112. To do so, the controller 150 supplies channel select signals to the multiplexers 204 to electrically couple each of the resistors 202, one at a time, to the appropriate sense/supply terminal 210. Each time a resistor 202 is electrically coupled to the appropriate sense/supply terminal 210, the controller 150 supplies an excitation current to the selected resistor 202 via the sense/supply terminal 210. It will be appreciated that the magnitude of the excitation current that the controller 150 supplies may vary, but in a particular preferred embodiment the controller 150 supplies about a 1.0 milliamp (mA) excitation current.

No matter its particular magnitude, it will be appreciated that the excitation current generates a voltage drop across the selected resistor 202. The controller 150 is further configured to read the generated voltage drop via the appropriate sense/supply terminal 210. As was noted above, the resistance value of each resistor 202 is preferably representative of one digit in a decade of each coefficient ($C_0$, $C_1$, $C_2$, ..., $C_N$). Thus, the generated voltage drop is concomitantly representative of one digit in a decade of each coefficient ($C_0$, $C_1$, $C_2$, ..., $C_N$). By reading the voltage drops generated across each of the resistors 202, the controller 150 determines, either implicitly or explicitly, the resistance value of each resistor 202. The controller 150 uses these values to generate the appropriate N-th order polynomial equation that represents the fuel metering valve 112 position control characteristic. The controller 150 then uses the generated equation to generate and supply the appropriate valve position commands 154 to the valve actuator 124.

The controller 150 may be configured to periodically determine the resistance values of the resistors 202, and thus generate the appropriate N-th order polynomial equation, or to do so upon the occurrence of specified events, or both. In a particular preferred embodiment, the controller 150 is configured to determine the resistance values of the resistors 202 each time the gas turbine engine (not illustrated) in which it is installed is started up.

The valve characteristic circuit 200 and methodology disclosed herein is not limited to use with a fuel metering valve 112 and a fuel control system 100. Rather, the circuit 200 and method may be implemented in any one of numerous types of valves and in any one of numerous types of systems. Moreover, the circuit 200 and method described herein provides a means of storing valve characterization data using simple, off-the-shelf circuit components, and without the need to provide auxiliary cooling to the circuit 200. The circuit 200 exhibits relatively high durability and high reliability at relatively high temperatures, as compared with current devices. Moreover, by using relatively high resolution and relatively high accuracy resistors for each digit in each of the coefficients, the circuit 200 exhibits relatively high accuracy.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A fuel metering system, comprising:
   a fuel metering valve coupled to receive valve position commands and operable, in response thereto, to move to a valve position, the fuel metering valve having a position control characteristic that is represented by an N-th order polynomial equation;
   a valve characteristic circuit mounted at least proximate the fuel metering valve, the valve characteristic circuit including a plurality of resistors, each resistor having a resistance value representative of at least one digit in the N-th order polynomial equation;
   a controller coupled to the valve characteristic circuit, the controller operable to:
   (i) selectively determine the resistance value of each resistor,
   (ii) determine the fuel metering valve position control characteristic using the determined resistance values, and
   (iii) selectively supply the valve position commands to the fuel metering valve using the determined fuel metering valve position control characteristic.

2. The system of claim 1, wherein:
   the valve characteristic circuit further includes a multiplexer disposed between the controller and at least a portion of the resistors, the multiplexer operable, in response to channel select signals, to selectively couple one of the plurality of resistors to the controller; and
   the controller is further operable to selectively supply the channel select signals to the multiplexer.

3. The system of claim 1, wherein the controller is configured to determine the resistance value of a resistor by:
   supplying an excitation current to the resistor to thereby generate a voltage drop across the resistor; and
   measuring the voltage drop across the resistor.

4. The system of claim 3, wherein the excitation current has a predetermined current magnitude.

5. The system of claim 4, wherein the predetermined current magnitude is about 1.0 milliamps.

6. The system of claim 1, wherein the position control characteristic is a flow versus valve position characteristic.

7. The system of claim 1, wherein:
   the N-th order polynomial equation includes N-number of coefficients;
   each resistance value represents a digit in a decade of one of the N-number of multi-decade coefficients.

8. The system of claim 1, further comprising:
   a position sensor operably coupled to the fuel metering valve for sensing a position of the fuel metering valve and supplying a fuel metering valve position signal representative thereof,
   wherein the controller is coupled to receive the fuel metering valve position signal and is further operable to selectively supply the valve position commands based at least in part thereon.

9. The system of claim 1, further comprising:
   a fuel supply line having an inlet adapted to receive a flow of fuel, and an outlet adapted to supply fuel to a turbine engine combustor,
   wherein the fuel metering valve is disposed in flow series in the fuel supply line to thereby control fuel flow through the fuel supply line.

10. The system of claim 9, further comprising:
    a flow sensor operably coupled to the fuel supply line for sensing flow rate of the fuel through the fuel supply line and supplying a flow signal representative thereof,
    wherein the controller is coupled to receive the flow signal and is further operable to selectively supply the valve position commands based at least in part thereon.

11. A valve assembly having a position control characteristic that is represented by an N-th order polynomial equation, the valve assembly comprising:
    a valve housing having at least a fluid inlet, a fluid outlet, an a flow passage between the fluid inlet and fluid outlet;
    a valve element mounted on the valve housing and disposed at least partially within the valve housing flow passage, the valve element movable between a closed position and an open position; and
    a valve characteristic circuit mounted on the valve housing, the valve characteristic circuit including a plurality of resistors, each resistor having a resistance value representative of at least one digit in the N-th order polynomial equation.

12. The valve of claim 11, wherein the valve characteristic circuit further includes:
    a multiplexer having a supply/sense terminal, a plurality of resistor terminals, and a plurality of channel select terminals, the supply/sense terminal adapted to receive an excitation current, each of the resistor terminals coupled to one of the resistors, and the channel select terminals adapted to receive channel select signals, the multiplexer operable, in response to the channel select signals, to selectively couple one of the resistors to the supply/sense terminal.

13. The valve assembly of claim 11, further comprising:
a valve actuator coupled to the valve element and adapted to receive valve position commands, the valve actuator responsive to the valve position commands to move the valve element between the open and the closed positions.

14. The valve assembly of claim 11, wherein the position control characteristic is a flow versus valve position characteristic.

15. The valve assembly of claim 11, wherein:
the N-th order polynomial equation includes N-number of coefficients;
each resistance value represents a digit in a decade of one of the N-number of multi-decade coefficients.

16. A method of supplying flow calibration data for a valve assembly, comprising the steps of:
measuring flow versus valve position data for the valve;
determining an N-th order polynomial curve fit equation from the measured flow versus position data, the N-th order polynomial curve fit equation including N-number of coefficients;
determining resistance values to represent at least one digit in each of the N-number of coefficients; and
mounting a plurality of resistors at least adjacent to the valve assembly, each resistor having a resistance value equal to one of the determined resistance values.

17. The method of claim 16, further comprising:
selectively determining the resistance values of each of the plurality of resistors;
generating the N-th order polynomial curve fit equation using the determined resistance values; and
controlling valve position using the N-th order polynomial curve fit equation to obtain a desired flow through the valve assembly.

18. The method of claim 17, wherein the step of selectively determining the resistance values of each of the plurality of resistors comprises:
selectively supplying an excitation current of a predetermined current magnitude to each resistor to thereby selectively generate a voltage drop across each resistor; and
measuring the voltage drop across each resistor.

19. The method of claim 18, wherein the predetermined current magnitude is about 1.0 milliamps.

20. The method of claim 16, wherein:
the N-th order polynomial equation includes N-number of coefficients;
each resistance value represents a digit in a decade of one of the N-number of coefficients.

* * * * *